US005332466A

United States Patent [19]

Nozawa

[11] Patent Number: 5,332,466

[45] Date of Patent: Jul. 26, 1994

[54] LIQUID JET RECORDING HEAD MANUFACTURING METHOD

[75] Inventor: Minoru Nozawa, Machida, Japan

[73] Assignee: Canon Kabushiki Kaisha, Tokyo, Japan

[21] Appl. No.: 111,270

[22] Filed: Aug. 24, 1993

Related U.S. Application Data

[63] Continuation of Ser. No. 799,546, Nov. 27, 1991, abandoned.

[30] Foreign Application Priority Data

Nov. 28, 1990 [JP] Japan ................................ 2-322446
Nov. 28, 1990 [JP] Japan ................................ 2-322447

[51] Int. Cl.[5] ........................ B44C 1/22; B29C 37/00

[52] U.S. Cl. .................................. 156/633; 156/630; 156/645; 156/655; 156/668

[58] Field of Search .............. 156/630, 633, 645, 655, 156/668; 346/1.1, 140 R

[56] References Cited

U.S. PATENT DOCUMENTS

| | | | |
|---|---|---|---|
| 4,313,124 | 1/1982 | Hara | 346/140 R |
| 4,345,262 | 8/1982 | Shirato et al. | 346/140 R |
| 4,392,907 | 7/1983 | Shirato et al. | 156/252 |
| 4,412,224 | 10/1983 | Sugitani | 346/1.1 |
| 4,417,251 | 11/1983 | Sugitani | 346/1.1 |
| 4,459,600 | 7/1984 | Sato et al. | 346/140 R |
| 4,463,359 | 7/1984 | Ayata et al. | 346/1.1 |
| 4,558,333 | 12/1985 | Sugitani et al. | 346/140 R |
| 4,657,631 | 4/1987 | Noguchi | 156/655 |
| 4,723,129 | 2/1988 | Endo et al. | 346/1.1 |
| 4,740,796 | 4/1988 | Endo et al. | 346/1.1 |
| 4,878,992 | 11/1989 | Campanelli | 156/633 |
| 5,030,317 | 7/1991 | Noguchi | 156/630 |

FOREIGN PATENT DOCUMENTS

| | | |
|---|---|---|
| 54-56847 | 5/1979 | Japan . |
| 57-43876 | 3/1982 | Japan . |
| 59-123670 | 7/1984 | Japan . |
| 59-138461 | 8/1984 | Japan . |
| 60-71260 | 4/1985 | Japan . |
| 62-253457 | 11/1987 | Japan . |
| 1128840 | 5/1989 | Japan . |
| 2189746 | 11/1987 | United Kingdom . |

*Primary Examiner*—William Powell
*Attorney, Agent, or Firm*—Fitzpatrick, Cella, Harper & Scinto

[57] ABSTRACT

A method for manufacturing a liquid jet recording head comprises the steps of coating a path wall forming member on a solid layer disposed on a substrate plate and having a liquid path pattern communicating with liquid discharge openings, binding a lid plate to the substrate plate via the path wall forming member, and removing the solid layer, thereby forming liquid paths. In the binding step the lid plate is bound to the substrate plate via spacer means having a thickness greater than that of the solid layer and disposed at an area which does not correspond to the path pattern and via the path wall forming member, while applying a pressure toward a binding position.

19 Claims, 11 Drawing Sheets

LIQUID JET RECORDING HEAD MANUFACTURING METHOD

This application is a continuation of application Ser. No. 07/799,546 filed Nov. 27, 1991, now abandoned.

BACKGROUND OF THE INVENTION

1. Field of the Invention

The present invention relates to a liquid jet recording head, and a method for manufacturing such liquid jet recording head, and a liquid jet recording apparatus using such liquid jet recording head.

2. Related Background Art

Generally, a liquid jet recording head includes fine recording liquid discharge openings, liquid passages communicating with the respective discharge openings, and energy generating elements arranged in correspondence to the respective liquid passages and each adapted to generate energy utilized to discharge the recording liquid from the corresponding discharge opening. In the past, as a technique for manufacturing such liquid jet recording head, it was known to prepare a plate made of glass, metal or the like, to form fine or narrow grooves in the plate by cutting or etching, and then to laminate the plate so formed with another suitable plate to define liquid passages therebetween.

However, in the liquid jet recording head manufactured by the above-mentioned conventional technique, it was difficult to obtain liquid passages having uniform liquid resistance because of the rough surface of the inner wall of the liquid passage worked or finished by the cutting or the distortion of the liquid passage due to the difference in the etching rate, thus causing irregularity in the recording liquid discharge feature of the liquid jet recording head. Further, when the head was manufactured by using the etching technique, a relatively large number of manufacturing steps were required, thus increasing the manufacturing cost of the head. In addition, as a problem common to the conventional techniques, when the plate in which the grooves for forming the liquid passages are formed was laminated with another plate (substrate) on which energy generating elements, such as piezo-electric elements or electrical/thermal converters for generating energy utilized to discharge the recording liquid, are disposed, it was difficult to register these plates with each other, thus reducing the productivity.

In order to eliminate the above-mentioned drawbacks, Japanese Patent Laid-open No. 57-43876 (corresponding to U.S. Pat. No. 4,417,251) discloses a method for manufacturing a liquid jet recording head as schematically shown in FIG. 1. More particularly, a photosensitive resin layer 16 (for example, made of LAMINAR (manufactured by DYNA CHEMICAL CO.), SR-1000G-50 (manufactured by HITACHI CHEMICAL CO.), SR-1000N (manufactured by HITACHI CHEMICAL CO.) or the like which are negative photosensitive resin films) is coated on a substrate plate 1 (FIG. 1A) on which energy generating elements 7 are formed, and then the plate is subjected to predetermined pattern exposure to form the cured areas on the photosensitive resin layer 16. Thereafter, by removing the non-cured resin material from the photosensitive resin layer, grooves for forming liquid paths including liquid passages 14 communicating with discharge openings 13 and a common liquid chamber 15 are obtained in the plate (FIG. 1B). Then, a lid 4 having a recess 9 communicating with liquid supply openings 6 is securely attached to the plate 1 with an adhesive 3, thus obtaining a liquid jet recording head (FIG. 1C). According to this manufacturing method, since the liquid paths are formed by the photolithography technique, the liquid paths can be formed uniformly and the productivity can be improved.

However, this method has the following drawbacks:

(a) It is feared that dirt and the like will enter into the liquid paths during the manufacture of the head after the formation of the liquid paths and before the lamination of the two plates, thus reducing the yield rate;

(b) Since adhesive is used to laminate the two plates, it is feared that the adhesive will enter into the liquid paths; and (c) The more the number and the density of the discharge openings are increased, the more the above problems (a) and (b) are noticeable.

In order to solve the above problems, Japanese Patent Laid-open No. 62-253457 (corresponding to U.S. Pat. No. 5,030,317) discloses a method as shown schematically in FIG. 2. More particularly, a solid layer 8 is disposed on a substrate plate 1 at a position where liquid paths are to be formed (FIG. 2A), and a layer made of material curable by active energy rays, as a path wall forming material 2, is laminated on the solid layer 8 (FIG. 2B) and then a lid 4 having a recess 9 communicating with liquid supply openings 6 is laminated on the material 2 (FIG. 2C). Thereafter, a photo-mask 12 is disposed, and then the active energy rays (shown by the arrows 11) are illuminated to cure a part of the material 2 (corresponding to a portion where the common liquid chamber to be formed) (FIG. 2D). Then, by supplying a solid removing liquid from the liquid supply opening 6 (FIG. 2E), the non-cured solid layer 8 is removed, thus forming the liquid passages communicating with the discharge openings 13 (FIG. 2F).

However, in such a method, particularly when the lid 4 is laminated, the following problems arise:

(1) When the lid 4 is laminated, it is necessary to apply a pressure to the lid 4 to an extent that the solid layer 8 is not destroyed by the lid. If the pressure is too high, a thickness of a top wall (ceiling wall) portion of the path wall forming material 2 is reduced. Consequently, it is feared that the top wall portion is broken or lowered into the liquid paths during the subsequent processes; and (2) When the lid 4 is laminated, if the above-mentioned pressure is too low, the lid 4 is not perfectly attached to the path wall forming material 2, with the result that the lid 4 will be curved to make the thickness of the path wall forming material 2 uneven. Consequently, it is feared that the shrinking stress of the thicker portion of the path wall forming material 2 is increased during the curing thereof to cause the curvature of the head itself and/or the peeling of the path wall forming material 2. Further, at the thinner portion of the path wall forming material 2, it is feared that there arises a problem similar to the above problem (1).

Although the above-mentioned problems are not so serious and can be coped with if the number of the discharge openings is relatively small and the density of the discharge openings is not so high, the more the number and density of the discharge openings are increased, the more the problems are noticeable. Particularly, in a liquid jet recording head of a so-called full-line type wherein a great number (for example, several thousands) of discharge openings are arranged across the whole recording area with high density and a great number of corresponding energy generating elements are arranged on the substrate plate with high density, the above problems are very serious.

SUMMARY OF THE INVENTION

An object of the present invention is to provide a new method for manufacturing a liquid jet recording head of high density multi-discharge opening type, which can eliminate the above-mentioned conventional drawbacks.

Another object of the present invention is to provide a method for manufacturing a liquid jet recording head, which can increase or enhance the dimensional and configurational accuracy of liquid passages.

A further object of the present invention is to provide a method for manufacturing a liquid jet recording head, comprising the steps of coating a path wall forming member on a solid layer disposed on a substrate plate and having a liquid path pattern communicating with liquid discharge openings, binding a lid plate to the substrate plate via the path wall forming member, and removing the solid layer, thereby forming liquid paths; and wherein, in the binding step, the lid plate is bound to the substrate plate via spacer means having a thickness greater than that of the solid layer and disposed at an area which does not correspond to the path pattern and via the path wall forming member, while applying a pressure toward a binding position.

A still further object of the present invention is to provide a liquid jet recording head manufactured by the above-mentioned method.

The other object of the present invention is to provide a liquid jet recording apparatus comprising the above-mentioned liquid jet recording head, and a member on which the liquid jet recording head is mounted.

The present invention includes a liquid jet recording head manufactured by the above-mentioned methods, and a liquid jet recording apparatus using such liquid jet recording head.

According to the present invention, since the thickness of the path wall forming member is kept uniformly and the ceiling wall portion of the member is not badly influenced upon the pressurization to keep the proper thickness with high accuracy, it is possible to manufacture even a liquid jet recording head of high density multi-discharge opening type with maintaining the high yield rate and with high accuracy.

DETAILED DESCRIPTION OF THE PREFERRED EMBODIMENTS

Figure 3:
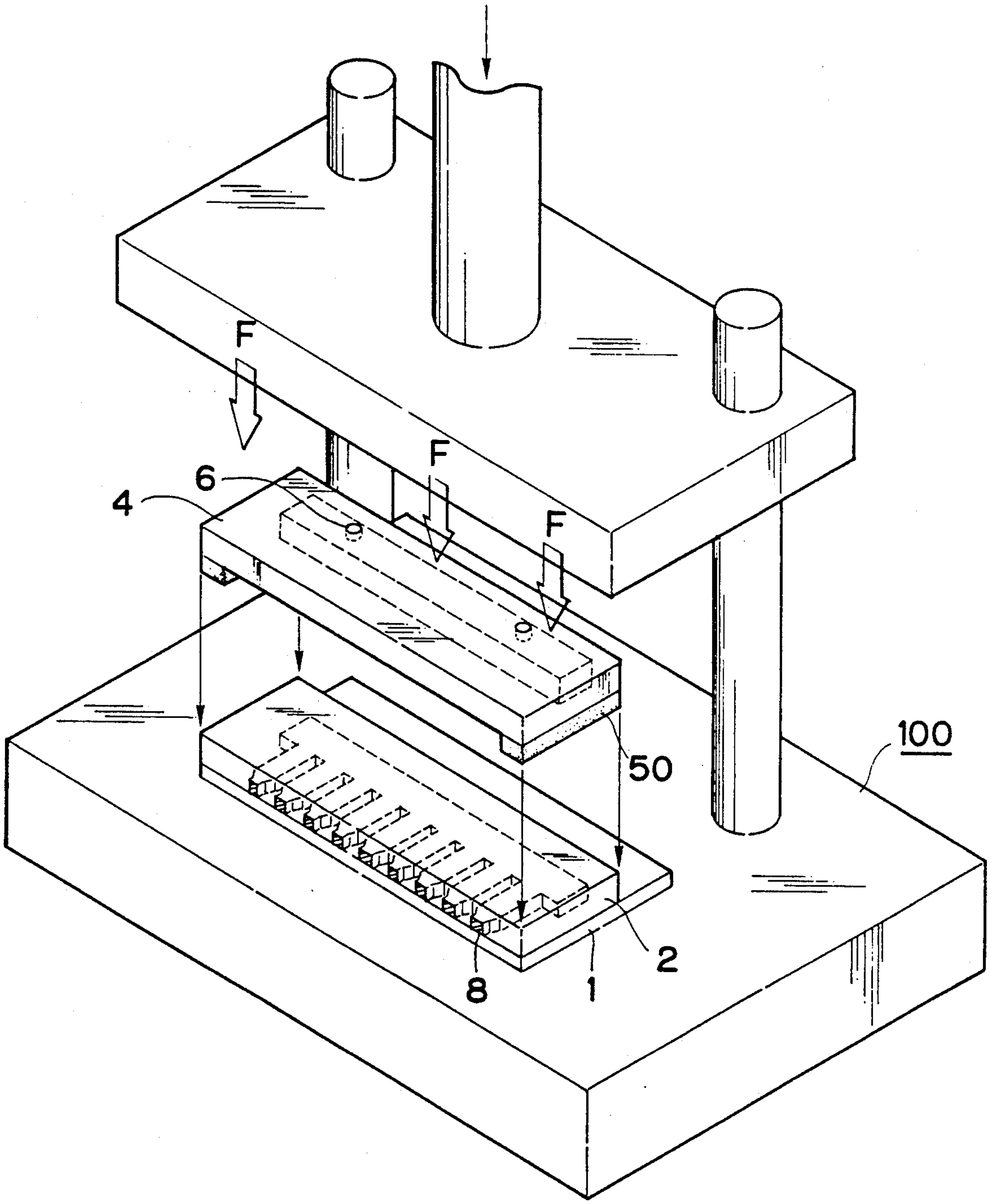
FIG. 3 is a schematic perspective view showing a representative process of a method for manufacturing a liquid jet recording head according to a preferred embodiment of the present invention.

FIG. 3 is a schematic perspective view showing a representative process for binding a lid plate 4 to a substrate plate 1 via a path wall forming member 2, in a method for manufacturing a liquid jet recording head according to a first embodiment of the present invention.

Figure 1A:
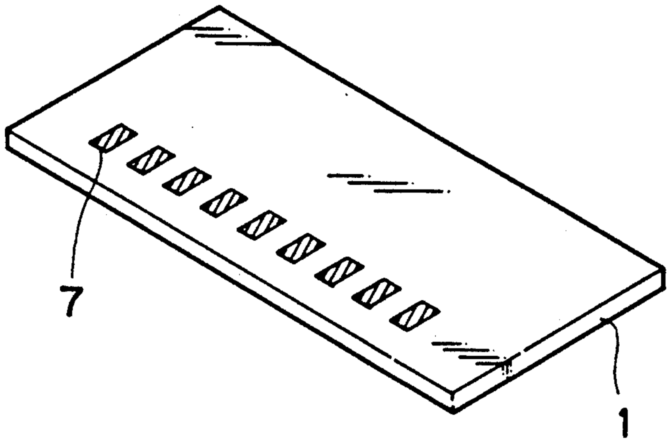
FIG. 1A PRIOR ART
FIGS. 1A to 1C and FIGS. 2A to 2F are perspective views for explaining conventional methods for manufacturing a liquid jet recording head, respectively.
Figure 1B:
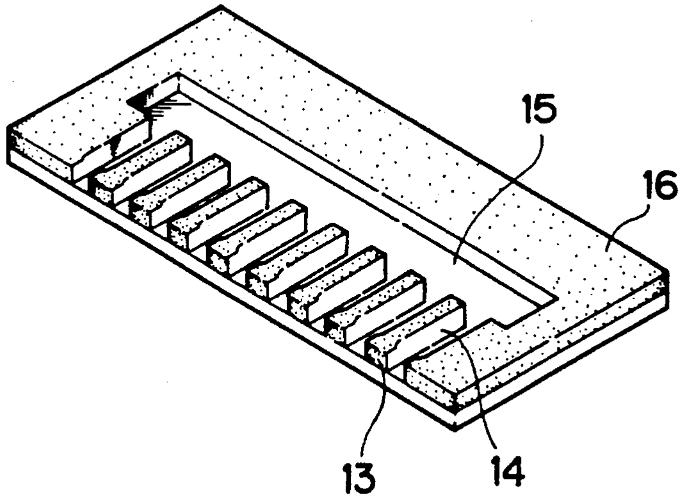
FIG. 1B PRIOR ART
Figure 1C:
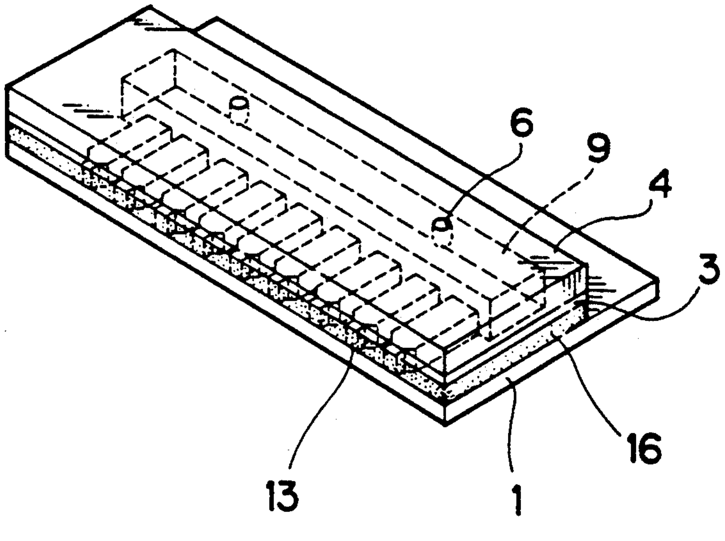
FIG. 1C PRIOR ART
Figure 2A:
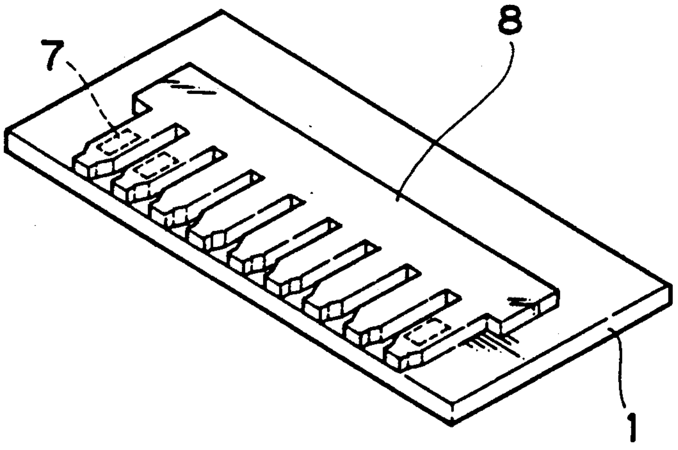
FIG. 2A PRIOR ART
Figure 2B:
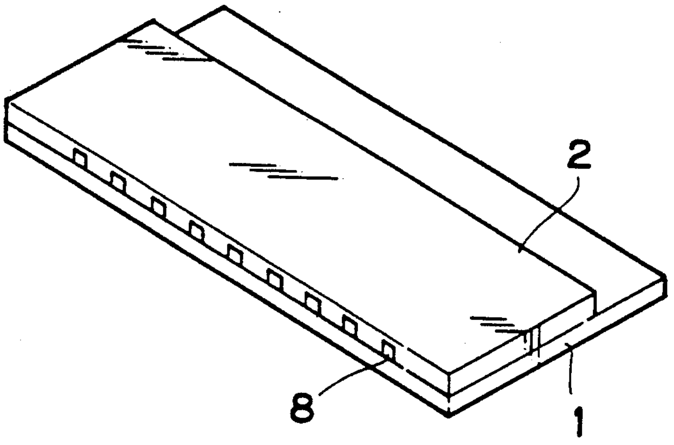
FIG. 2B PRIOR ART
Figure 2C:
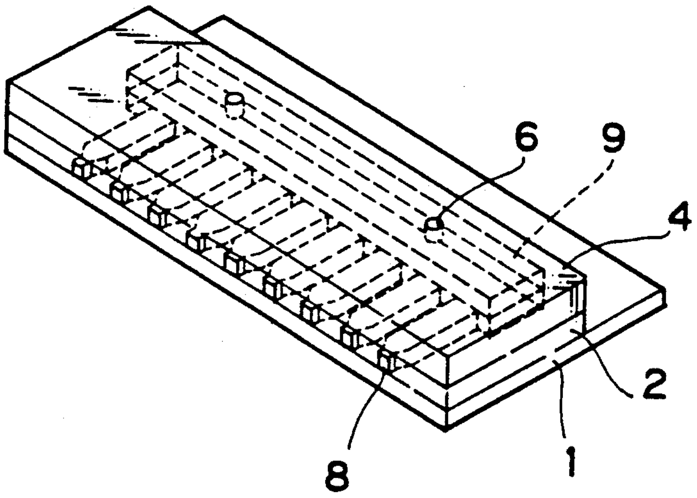
FIG. 2C PRIOR ART
Figure 2D:
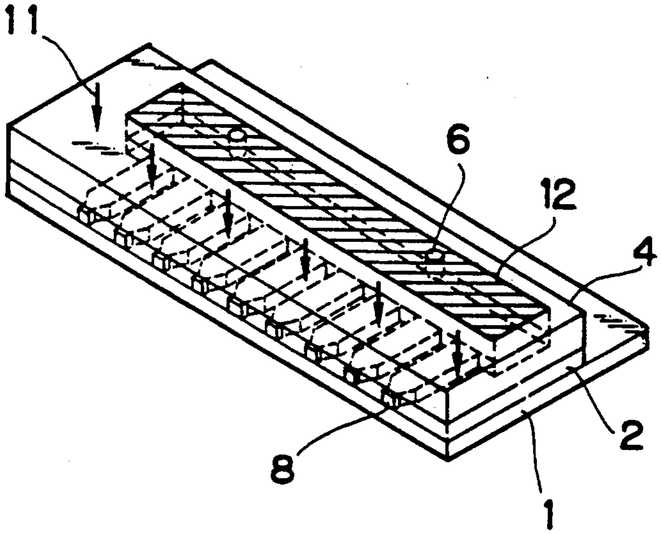
FIG. 2D PRIOR ART
Figure 2E:
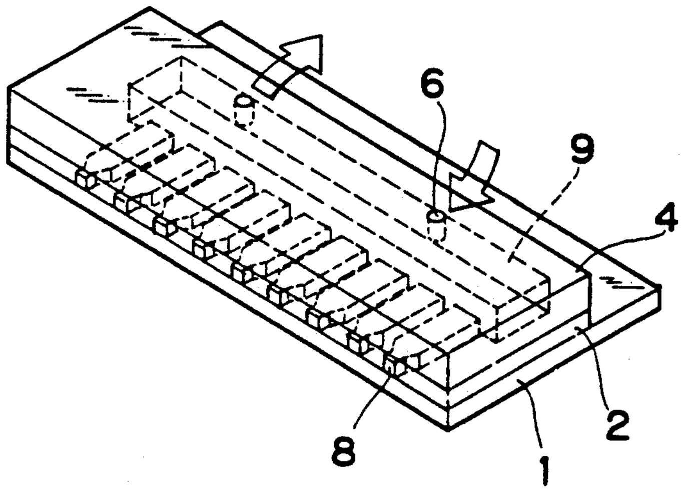
FIG. 2E PRIOR ART
Figure 2F:
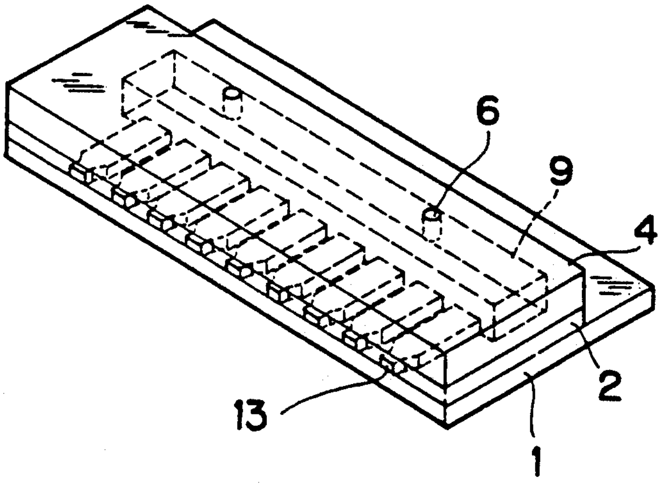
FIG. 2F PRIOR ART

In this process, the substrate plate 1 on which a solid layer 8 and the path wall forming member 2 (material of which may preferably be in the liquid form initially) were laminated in the same manner as those shown in FIGS. 2A and 2B and the lid plate 4 on a binding surface of which spacer members 50 were disposed are bound to each other by means of a binding device 100 with a pressure F (pressure for urging the lid plate 4 toward a binding position). Thereafter, the same processes as those shown in FIGS. 2D to 2F are performed. In such a manufacturing method, the path wall forming member 2 also serves to adhere the lid plate 4 to the substrate plate 1. In FIG. 3, since the spacer members 50 are disposed on the path wall forming member 2, the spacer members are bound to the substrate plate via the path wall forming member (In this case, the path wall forming member situated at positions corresponding to the spacer members is collapsed under the pressure during the binding operation to have a thickness of, for example, 10 μm or less, which is substantially negligible).

Now, the spacer members are preferably adherent to both of the path wall forming member and the substrate plate. However, for example, in an embodiment shown in FIGS. 6 and 7 which will be described later, since an assembly (head) is cut along the lines A—A' and B—B', the good adhesion between the spacer members and the substrate plate is not necessarily required. In the embodiment shown in FIG. 3, when the spacer members are made of the same material as that of the path wall forming member, the adhesion ability between the spacer members and the path wall forming member can be remarkably improved.

Preferably, the spacer members are arranged on the lid plate for the reason that, since the high density wiring is not disposed on the lid plate, the spacer members can be roughly applied to the lid plate. That is to say, the spacer members can be applied to the lid plate with the adequate accuracy even by the screen printing technique or the metered coating technique using a dispenser, and, thus, the patterning technique using lithography, which is very expensive, is not necessarily required.

By providing the spacer members, the spacer members can avoid the generation of the excessive stress transmitted from the lid plate to the solid layer when the lid plate is bound to the path wall forming member with pressure, thus achieving the uniform binding between the lid plate and the path wall forming member wholly. Consequently, the peeling of the lid plate and the distortion of the solid layer can be avoided, thus forming the liquid passages easily with high accuracy.

It is necessary that the spacer member is thicker than the solid layer, and, preferably, the former is thicker than the latter by 10 μm or more. For example, when the thickness of the solid layer (corresponding to the height of each liquid passage) is 20 μm, the thickness of the spacer member may be 30 μm or more and it is preferable that the thickness of the spacer member is normally about 30-500 μm.

Figure 5:
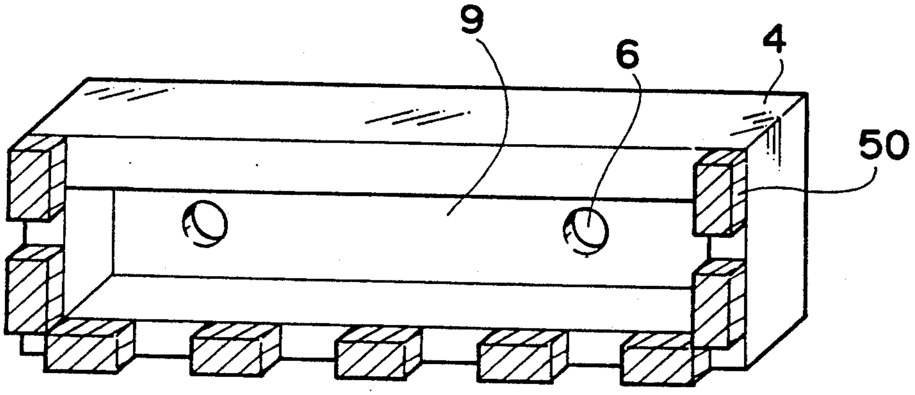
FIG. 5 is a perspective view of a lid plate on which spacer members are disposed, according to another embodiment of the present invention.

The shape or configuration of each spacer member may be prismatic as shown in FIG. 3 or may be semi-cylindrical. The positions of the spacer members are not limited, so long as they do not interfere with the liquid paths and the lid plate can be bound to the path wall forming member with good balance. For example, as shown in FIG. 3, two spacer members 50 may be disposed on both ends of the lid plate in an overlapped relation to the path wall forming member 2, or, as shown in FIG. 5, a plurality of spacer members 50 spaced apart at predetermined intervals may be arranged around a recess 9. In the latter case, since the material of the path wall forming member 2 penetrates into spaces between the spacer members 50, the adhering areas between the spacer members and the path wall forming member are increased, thus achieving the more reliable bonding. Further, in a head manufacturing method wherein two liquid jet recording heads are manufactured at a time by assembling the elements for two heads on a single substrate plate in opposed relation to each other at a discharge opening surface and then by cutting the substrate plate along the discharge opening surface, two spacer members may be arranged on both ends of the substrate plate opposite to the discharge opening surface.

Figure 6:
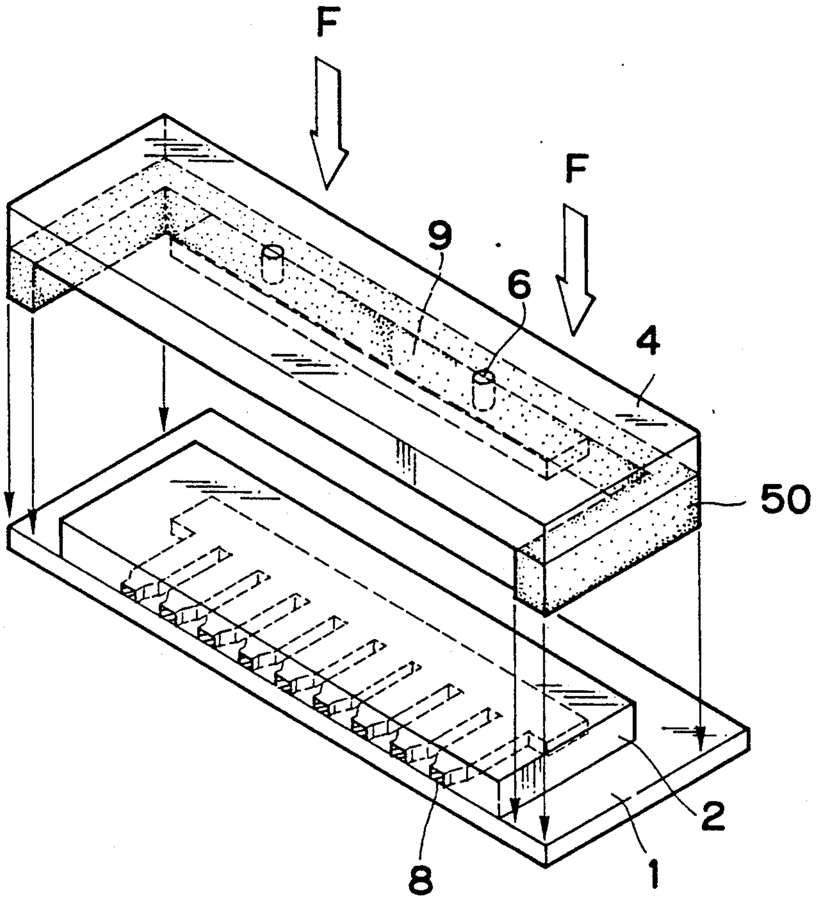
FIG. 6 is a perspective view showing a process for binding the lid plate to the substrate plate according to a further embodiment of the present invention.
Figure 7:
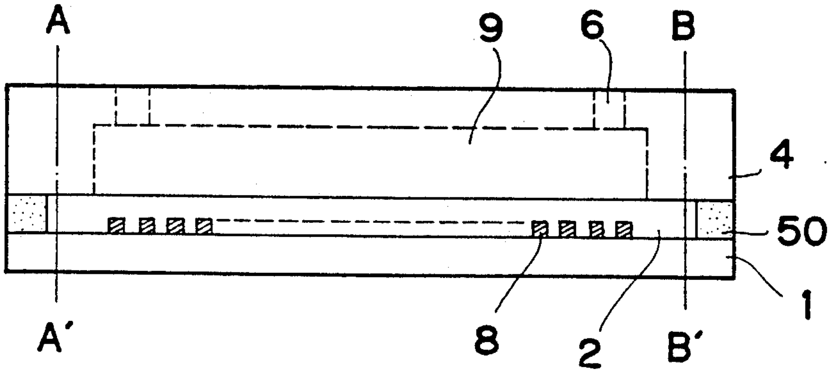
FIG. 7 is a sectional view showing the binding condition between the substrate plate and the lid plate achieved by the process of FIG. 6.

Further, as shown in FIG. 6, the spacer member 50 may be arranged on the lid plate 4 at a position where the spacer member is not overlapped with the path wall forming member 2, i.e., a position where there is no path wall forming member. In this case, after the lid plate 4 is bound to the substrate plate 1, the path wall forming member 2 is cured by illuminating the active energy rays, and then, the assembly is cut along the lines A—A' and B—B' in FIG. 7 by means of, for example, a diamond cutter blade. In this condition, since there are no complex interface conditions due to the adhesion between three elements, i.e., spacer members, path wall forming member and substrate plate, the whole reliability of the head can be more improved. Incidentally, in this embodiment, the spacer members are not necessarily removed by cutting in the above-mentioned manner.

The material for forming the spacer member may be epoxy resin, acrylic resin or the like. The spacer members may be disposed on the lid plate by the screen printing technique or coating technique using a dispenser. In the case where the spacer member is made of photosensitive material, since it is preferable that it has already been cured when the lid plate is bound to the substrate plate, the spacer members are previously cured by illuminating the active energy rays thereto. Incidentally, as mentioned above, it is preferable that the spacer members are made of the same material as that of the path wall forming member mainly in view of the adhesion ability.

The material of the path wall forming member may be a liquid having the viscosity of, for example, 100-10000 cps which is curable by the active energy rays such as ultraviolet rays or electronic beams, and is applied on the substrate plate while being enclosed not to flow out of the plate. Among the materials curable by the active energy rays, epoxy resin, acrylic resin, diglycol-dialkyl carbonate resin, unsaturated polyester resin, polyurethane resin, polyimide resin, melamine resin, phenol resin, urea resin and the like are preferable. Particularly, epoxy resin which can start cationic polymerization by light, acryl oligomer class having acrylester group which can start radical polymerization by light, photoaddition polymerization resin including polythiol and polyene, unsaturated cycloacetal resin and the like are suitable, since they have the faster polymerization rate and the excellent polymer property.

The binding device used for binding the lid plate to the substrate plate may be of the type that it can stably provide the pressure of, for example, $1\times10^{-3}$-100 kgf/cm$^2$.

Figure 4:
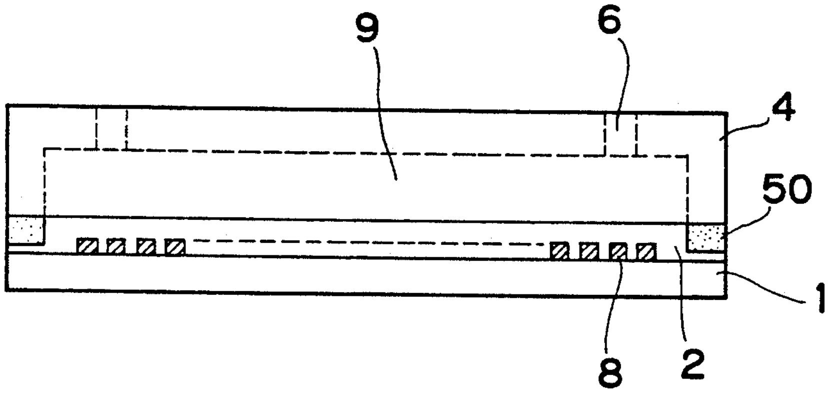
FIG. 4 is a schematic sectional view showing a binding condition between a substrate plate and a lid plate achieved by the process of FIG. 3.

A binding condition between the lid plate and the substrate plate achieved in the above-mentioned manner is shown in FIG. 4. FIG. 4 shows the binding condition obtained in the embodiment of FIG. 3. Since the path wall forming member 2 is bridged by the spacer members 50, even when the pressure is applied during the binding operation, the solid layer is not destroyed. Further, even when the lid plate is shifted to register it with the substrate plate, since it can be shifted in the bound condition, there is no need to use any expensive aligning device that the alignment is performed by providing a narrow clearance, but the alignment can be attained only by using a simple tool having a micrometer. Further, since the lid plate is bound to the substrate plate with the proper pressure, even if the lid plate is initially curved, the unevenness in the thickness of the path wall forming member does not occur.

The substrate plate may be made of Si, glass, seramics and the like, the solid layer may be made of positive photosensitive resin film (for example, "OZATEC R255" (registered trade mark) manufactured by Hexist Japan Co.), and the lid plate may be made of material permeable to the active energy rays, such as glass, transparent ceramics and the like.

Next, another preferred embodiment of the present invention will now be explained with reference to the accompanying drawings.

Figure 8:
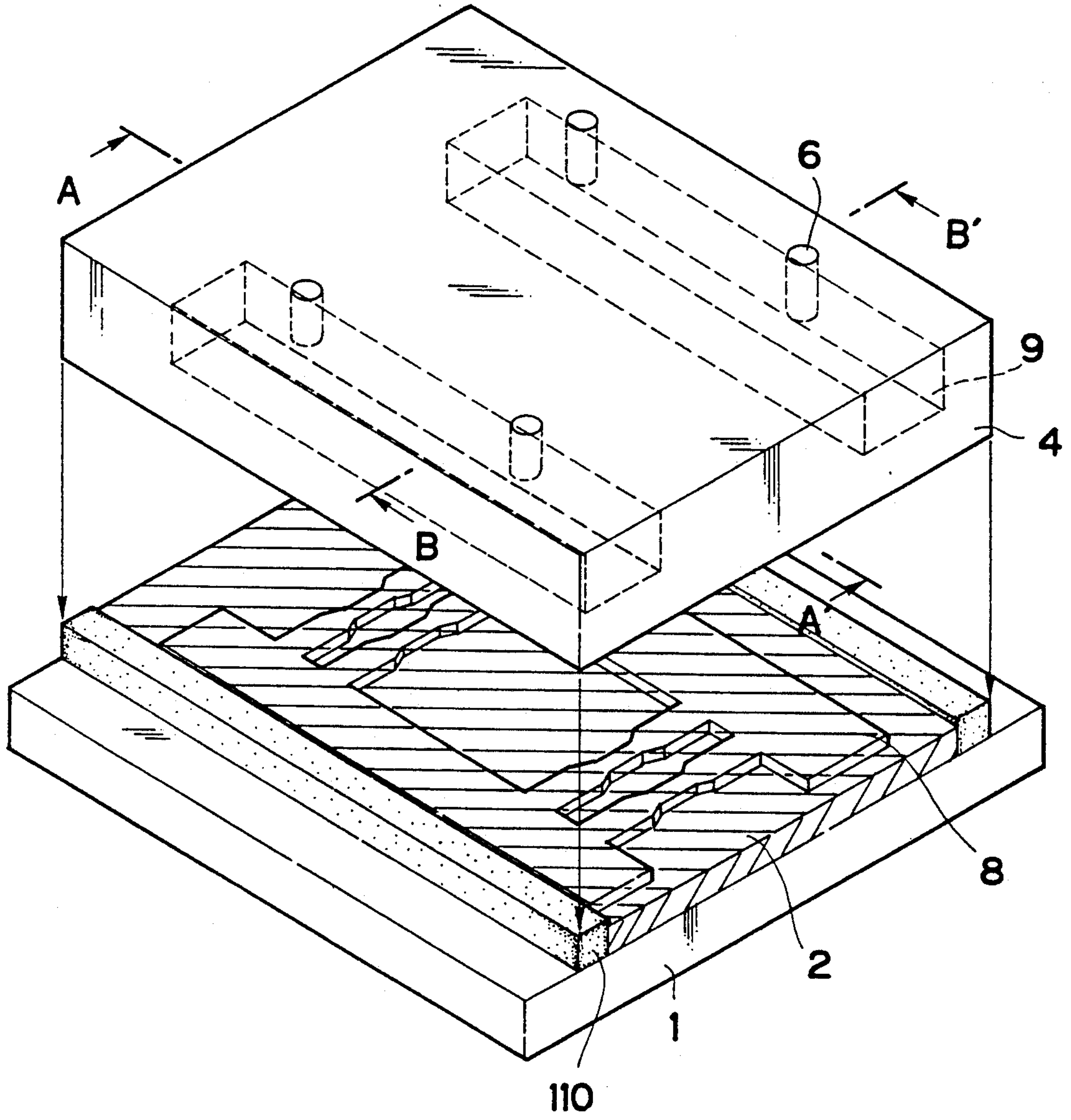
FIG. 8 is a perspective view of showing a representative process of a method for manufacturing a liquid jet recording head according to another embodiment of the present invention.

FIG. 8 is a schematic perspective view shoiwng a representative process for binding a lid plate 4 to a substrate plate 1 via a path wall forming member 2, in a method for manufacturing a liquid jet recording head according to a second embodiment of the present invention. In this embodiment, common electrodes 110 also act as spacer members, whereby the lid plate 4 is properly bound to the substrate plate 1 with the pressure (pressure for urging the lid plate toward a binding position), without generating the stress on the solid layer.

The substrate plate used in this embodiment may be made of Si, glass, ceramics and the like. As schematically shown in FIG. 10, on the substrate plate 1, there are disposed a plurality of energy generating portions 100 of energy generating elements (for example, heat generating portions of electrical/thermal converters), common electrodes 110 forming a multi-layer wiring having through hole portions 101 connected to the corresponding energy generating portions 100 via wiring electrodes 101*a*, and discrete electrode terminals 102 connected to corresponding wiring electrodes 102*a* connected to driver IC (not shown) for driving the energy generating elements.

In this embodiment, before the path wall forming member 2 is coated on the substrate plate 1, by disposing the common electrodes as spacer members on the substrate plate, when the lid plate is bound to the path wall forming member which is made of material curable by the active energy rays while applying the pressure, since the common electrodes acting as the spacer members bridge the lid plate, the solid layer is not subjected to the excessive stress, thus permitting the uniform binding. Therefore, the peeling of the lid plate and the distortion of the solid layer can be avoided, thus forming the liquid passages with high accuracy. It is preferable that the thickness, configuration and position of the spacer members are the same as those described in the previous embodiment.

Figure 10:
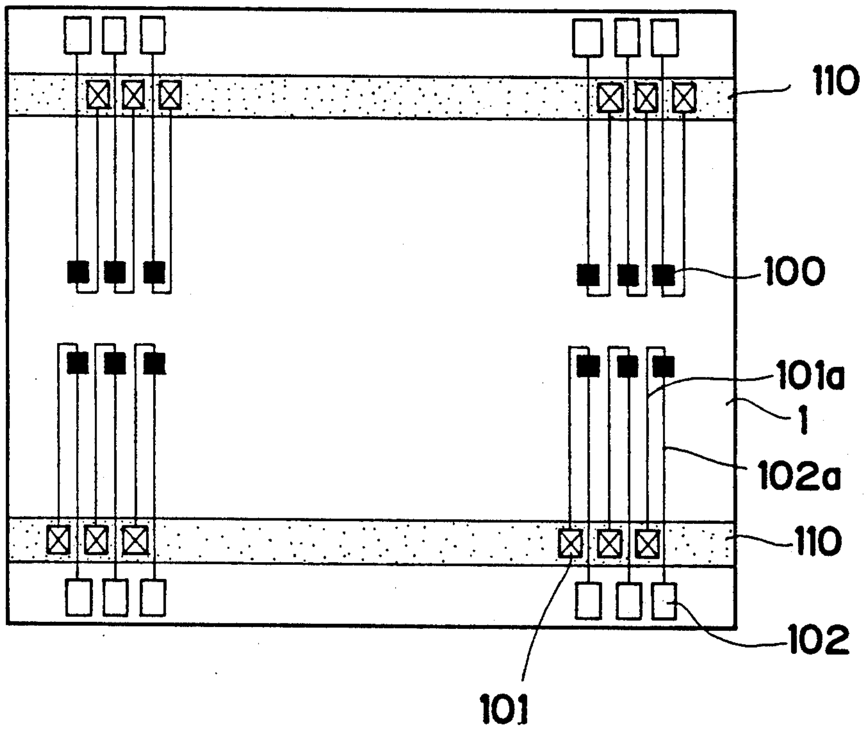
FIG. 10 is a schematic plan view of the substrate plate used with the method of FIG. 8, showing a wiring pattern disposed thereon.

Although the energy generating elements are not limited to those disposed on the substrate plate as shown in FIG. 10, when the energy generating elements are disposed on the substrate plate, in many cases, the common electrodes are arranged at the positions as shown in FIG. 10. The common electrodes may be formed by electroplating with copper or gold; however, particularly, in case of the liquid jet recording head of high density multi-discharge opening type, they may be in the thick film-shape having a thickness of about 10–100 μm so as to reduce the irregularity in the voltage reduction between the liquid passages and also to decrease the voltage reduction value.

In this way, the characteristic of this embodiment is that the thick film common electrodes are also used as the spacer members. That is to say, by using the common electrodes as the spacer members, it is possible to reduce and stabilize the voltage reduction value between the liquid passages and to expect the advantage of the above-mentioned spacer members, and further to simplify the manufacturing processes because of no provision of new or additional spacer members.

Then, in the same manner as those shown in FIG. 2 (Incidentally, FIG. 2 shows the case where the single head is manufactured, whereas, FIG. 8 shows the case where two heads are manufactured at a time), the solid layer 8 and the path wall forming member 2 are sequentially laminated (see FIGS. 2A and 2B), and the lid plate 4 is bound to the substrate plate while applying the pressure (of the order of $1\times10^{-3}$–100 kgf/cm$^2$) in such a manner that a portion of the lid plate is overlapped with a portion of the common electrodes 110. Thereafter, the same processes as those shown in FIGS. 2D to 2F are performed (However, in the case where the two heads are manufactured at a time as shown in FIG. 8, an additional process for cutting the assembly along the line A—A' by means of a diamond cutter blade is carried out between the processes of FIGS. 2E and 2F or before the process of FIG. 2F). In this manufacturing method, the path wall forming member also serves to adhere the substrate plate to the lid plate.

In the illustrated embodiment, the spacer portions may be formed on the substrate plate before the path wall forming member is coated on the substrate plate. That is to say, a process for forming the spacer portions by photolithography technique and the like before the solid layer is disposed may be performed independently or may be performed at the same time as the process for forming the energy generating elements. In the preferable forming process, the spacer portions are formed by electrolytic plating or non-electrolytic plating with copper or gold during the formation of the common electrodes for the energy generating elements. In this way, the process for forming the spacer portions may be incorporated into the appropriate process or may be performed independently in accordance with the liquid jet recording head to be manufactured.

Figure 9A:
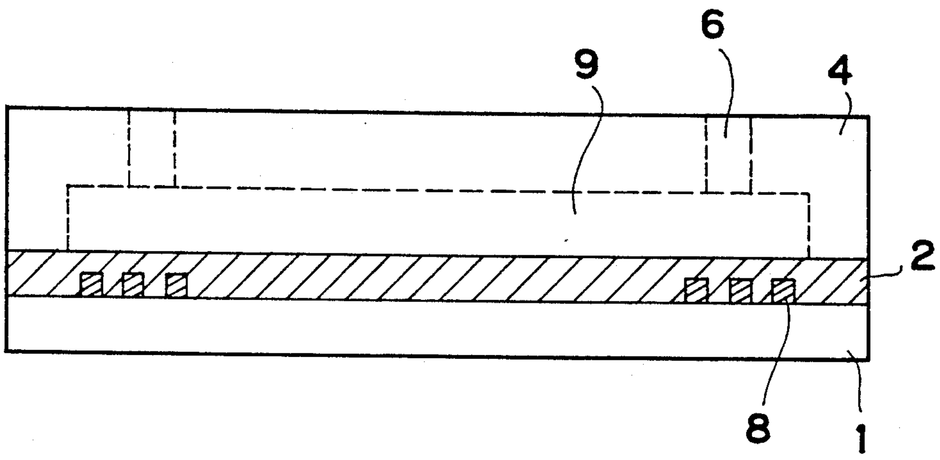
FIGS. 9A and 9B are sectional views showing a binding condition between a substrate plate and a lid plate achieved by the process of FIG. 8, taken along the lines A—A' and B—B' in FIG. 8, respectively.
Figure 9B:
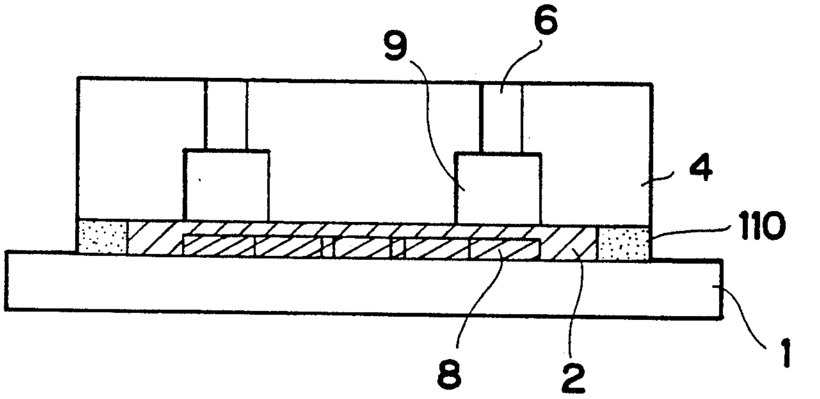

FIGS. 9A and 9B are sectional views showing the binding condition between the lid plate 4 and the substrate plate 1, taken along the lines A—A' and B—B' in FIG. 8, respectively. In FIG. 9B, if the path wall forming member 2 is loaded even on the common electrodes 110, when the lid 4 is bound to the common electrodes with the proper pressure, since the thickness of the path wall forming member 2 on the common electrodes 110 becomes uniform and is thinned to the negligible extent, the excellent technical effect or advantage can be expected by this embodiment. As seen from FIG. 9B, since the liquid paths are bridged by the common electrodes 110, during the binding operation, even when the pressure is applied, the solid layer is not destroyed. Further, even when the lid plate is shifted to register it with the substrate plate, since it can be shifted in the bound condition, there is no need to use any expensive aligning device that the alignment is performed by providing a narrow clearance, but the alignment can be attained only by using a simple tool having a micrometer. Further, since the lid plate is bound to the substrate plate with the proper uniform pressure, even if the lid plate is initially curved, the unevenness in the thickness of the path wall forming member does not occur.

Figure 11:
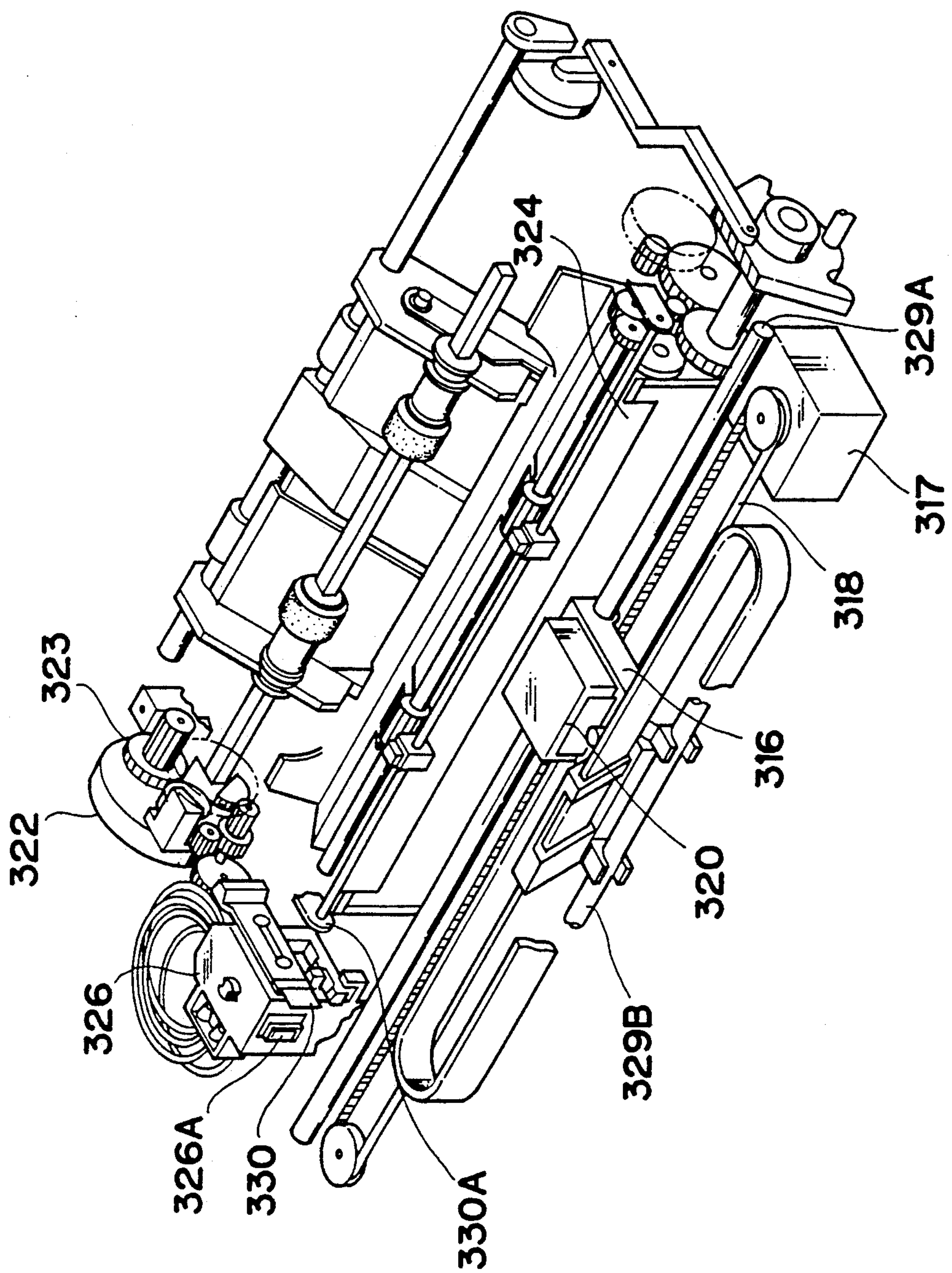
FIG. 11 is a schematic perspective view of a main portion of a liquid jet recording apparatus.

Next, an example of a liquid (ink) jet recording apparatus on which the liquid jet recording head manufactured as mentioned above is mounted will be explained with reference to FIG. 11. FIG. 11 is a schematic perspective view of a main part of the liquid jet recording apparatus.

In FIG. 11, an ink jet recording head 320 of removable cartridge type has a plurality of ink discharge openings in confronting relation to a recording surface of a recording sheet (not shown) carried by a platen 324 and has an ink reservoir portion integrally formed therewith. A carriage 316 on which the ink jet recording head 320 is mounted is connected to a portion of a driving belt 318 for transmitting a driving force from a drive motor 317 to the carriage and is slidably shifted along two parallel guide shafts 329A, 329B. Thus, the ink jet recording head 320 can be reciprocably moved across the whole width of the recording sheet.

A recovery device 326 for recovering the poor ink discharge from the ink jet recording head 320 and for performing the preliminary discharge is disposed at a predetermined position within the moving range of the ink jet recording head 320, for example, at a position in confronting relation to a home position of the head. The recovery device 326 serves to cap the ink discharge openings of the ink jet recording head 320 by a driving force from a motor 322 via a transmission mechanism 323. In relation to the capping operation for capping the ink discharge openings of the ink jet recording head 320 by a cap 326A of the recovery device 326, the ink suction from the discharge openings is effected by means of an appropriate suction means (not shown) provided in the recovery device 326, or the ink pressure supply is effected by means of an appropriate pressurizing means (not shown) provided in an ink supply path to the ink jet recording head. In this way, the ink is forcibly discharged from the discharge openings, thus performing the recovery treatment to remove foreign matters such as ink having the increased viscosity.

A wiping blade 330 made of silicone rubber is disposed at a side of the recovery device 326. The blade 330 is cantilevered by a blade holding member 330A and is driven by the motor 322 and the transmission mechanism 323, as similar to the recovery device 326, so that it can be engaged by a discharge opening surface of the ink jet recording head 320. Accordingly, for example, at an appropriate timing during the recording operation of the ink jet recording head 320 or after the recovery treatment by means of the recovery device 326, by protruding the blade 330 within the moving range of the ink jet recording head 320, ink droplets, moisture, dirt and other foreign matters adhered on the discharge opening surface of the ink jet recording head 320 can be cleaned or removed as the head 320 is shifted.

The operations of a recording sheet feeding means, carriage, recovery device and recording head of the ink jet recording apparatus are controlled by commands and signals outputted from a control means including a CPU of the apparatus.

Figure 12:
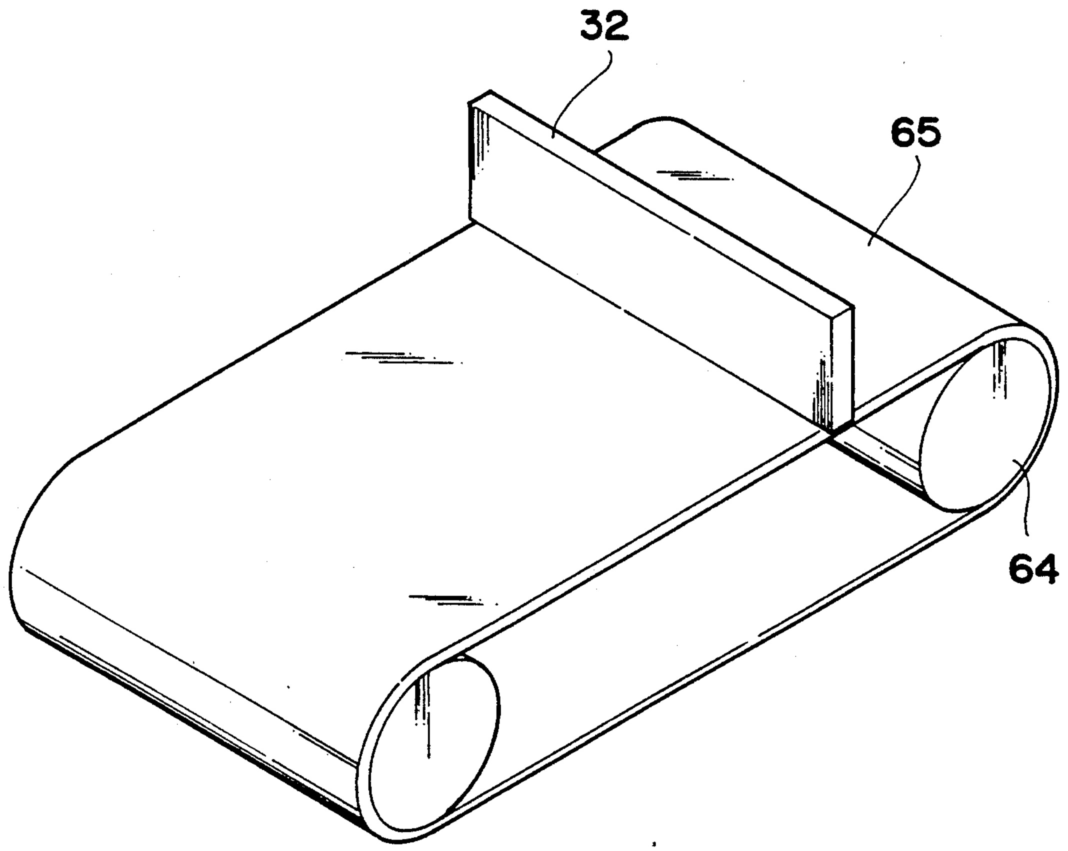
FIG. 12 is a perspective view schematically showing a liquid jet recording apparatus on which a liquid jet recording head of full-line type is mounted.

FIG. 12 is a schematic perspective view of an ink jet recording apparatus on which an ink jet recording head of full-line type is mounted. In FIG. 12, a convey belt 65 serves to feed a recording sheet such as a paper (not shown) in response to the rotation of a feed roller 64. An ink jet recording head 32 has a discharge opening surface 31 facing a recording area of the recording sheet and including a plurality of ink discharge openings.

Next, detailed examples will be described.

EXAMPLE 1

An ink jet recording head was manufactured in accordance with the processes schematically shown in FIGS. 2A, 2B, 3, 4 and 2D–2F.

First of all, a photosensitive resin layer comprising the positive photosensitive resin film "OZATEC R255" (registered trade mark; manufactured by Hexist Japan Co.) having a thickness of 20 μm was laminated, at a temperature of 100° C. with a pressure of 3 kg/cm$^2$, on a substrate plate made of glass on which electrical/thermal converters for generating thermal energy (as energy generating elements 7 for generating energy utilized to discharge ink) are formed. After a photo-mask (not shown) was overlapped with the photosensitive resin layer, by illuminating the ultraviolet rays of 70 mJ/cm$^2$ on the resin layer at areas other than the areas where ink passages are to be formed, a latent image was formed on the photosensitive resin layer. Then, the substrate plate with the photosensitive resin layer was immersed into a solution including NaOH of 1% to develop the latent image as shown in FIG. 2A. Thereafter, the substrate plate with resin layer was rinsed with pure water and then was subjected to the natural drying.

Then, as shown in FIG. 2B, the material "ARALDITECY 230/HY956" (registered trade mark; manufactured by CIBA GEIGY Co.) was applied, by an applicator, on the developed and patterned photosensitive resin layer 8 to form a path wall forming member 2 for forming walls of the ink passages, having a thickness of 30 μm. Then, the path wall forming member 2 was cured by leaving it under temperature of 30° C. for 12 hours.

Then, the material "ARALDITECY 230/HY956" (registered trade mark; manufactured by CIBA GEIGY Co.) same as that of the path wall forming member 2 was applied, by an applicator, on both ends of a lid plate 4 to form spacer members 50 having a thickness of 30 μm. Then, the spacer members 50 were cured by leaving them under temperature of 30° C. for 12 hours. Then, the substrate plate and the lid plate so formed were mounted on the binding device as shown in FIG. 3, whereby the lid plate 4 was bound to the substrate plate with a pressure of $3\times10^{-2}$ kgf/cm$^2$ to obtain the assembly as shown in FIG. 4.

Thereafter, as shown in FIG. 2D (spacer members are not shown, as similar to FIGS. 2E and 2F), by illuminating the ultraviolet rays of 3000 mJ/cm$^2$ on the substrate plate, the patterned photosensitive resin layer 8 was permitted to be liquidified.

Then, as shown in FIG. 2E, the assembly was immersed into a peeling liquid comprising a solution including NaOH of 5% and, by supplying the peeling liquid from the supply opening 6, the photosensitive resin layer was removed. Then, the assembly was rinsed with pure water and then was subjected to natural drying. In this way, an ink jet recording head schematically shown in FIG. 2F was obtained.

This ink jet recording head had 128 (in number) ink discharge openings 13 each having a rectangular dimension of 20 μm×20 μm, and corresponding numbers of ink passages communicating with the respective ink discharge openings and electrical/thermal converters associated therewith (all of these elements are not shown in the drawings).

It was found that the dimensional and configurational accuracy of the ink passages of this ink jet recording head was excellent. Further, it was found that, when this ink jet recording head was mounted on the ink jet recording apparatus shown in FIG. 11 and the ink was actually discharged from the ink discharge openings, the wholly excellent discharging property and stable recording were obtained for a long time.

EXAMPLE 2

An ink jet recording head was manufactured in accordance with the processes schematically shown in FIGS. 2A to 2F.

First of all, a substrate plate 1 made of glass on which electrical/thermal converters for generating thermal energy (as energy generating elements 7 for generating energy utilized to discharge ink) are formed was prepared. In this case, the common electrodes 110 was obtained by electroplating with gold to have a thickness of 50 μm so that they can also act as the spacer members.

Then, a photosensitive resin layer comprising the positive photosensitive resin film "OZATEC R255" (registered trade mark; manufactured by Hexist Japan Co.) having a thickness of 20 μm was laminated on the glass substrate plate 1 except for the common electrodes 110 (see FIG. 8), at a temperature of 100° C. with a pressure of 3 kg/cm$^2$. After a photo-mask (not shown) was overlapped with the photosensitive resin layer, by illuminating the ultraviolet rays of 70 mJ/cm$^2$ on the resin layer at areas other than the areas where ink passages are to be formed, a latent image was formed on the photosensitive resin layer. Then, the substrate plate with the photosensitive resin layer was immersed into a solution including NaOH of 1% to develop the latent image as shown in FIG. 2A (only one head is shown and spacer members are not shown, as similar to FIGS. 2B to 2F). Thereafter, the substrate plate with resin layer was rinsed with pure water and then was subjected to the natural drying.

Then, as shown in FIG. 2B, the material "ARALDITECY 230/HY956" (registered trade mark; manufctured by CIBA GEIGY Co.) was applied, by an applicator, on the developed and patterned photosensitive resin layer 8 to form a path wall forming member 2 for forming walls of the ink passages, having a thickness of 30 μm. Then, the path wall forming member 2 was cured by leaving it under temperature of 30° C. for 12 hours.

Then, as shown in FIG. 8, a lid plate 4 was bound to the substrate plate with a pressure of $3\times10^{-2}$ kgf/cm$^2$ to obtain the assembly as shown in FIG. 9.

This assembly was cut along the line A—A' in FIG. 8 by means of a diamond cutter blade.

Thereafter, as shown in FIG. 2D, by illuminating the ultraviolet rays of 3000 mJ/cm$^2$ on the substrate plate, the patterned photosensitive resin layer 8 was permitted to be liquidified.

Then, as shown in FIG. 2E, the assembly was immersed into a peeling liquid comprising a solution including NaOH of 5%, and, by supplying the peeling liquid from the supply opening 6, the photosensitive resin layer was removed. Then, the assembly was rinsed with pure water and then was subjected to the natural drying. In this way, an ink jet recording head schematically shown in FIG. 2F was obtained.

This ink jet recording head had 128 (in number) ink discharge openings 13 each having a rectangular dimension of 20 μm×20 μm, and corresponding numbers of ink passages communicating with the respective ink discharge openings and electrical/thermal converters associated therewith (all of these elements are not shown in the drawings).

It was found that the dimensional and configurational accuracy of the ink passages of this ink jet recording head was excellent. Further, it was found that, when this ink jet recording head was mounted on the ink jet recording apparatus shown in FIG. 11 and the ink was actually discharged from the ink discharge openings, the wholly excellent discharging property and stable recording were obtained for a long time.

Incidentally, when the present invention is applied particularly to an ink jet recording system for discharging the ink by utilizing thermal energy, among various ink jet recording systems, the present invention gives the excellent advantages.

Preferably, the typical construction and principle thereof can be realized by using the fundamental principles, for example, disclosed in U.S. Pat. Nos. 4,723,129 and 4,740,796. Although this system can be applied to both a so-called "on-demand type" and "continuous type", it is more effective when the present invention is particularly applied to the on-demand type, because, by applying at least one drive signal corresponding to the record information and capable of providing the abrupt temperature increase exceeding nucleate boiling to the electrical/thermal converting elements arranged in correspondence to the paper or liquid passages including the liquid (ink) therein, it is possible to form a bubble in the liquid (ink) in corresponding to the drive signal by generating the film boiling on the heat acting surface of the recording head due to the generation of the thermal energy in the electrical/thermal converting elements. Due to the growth and contraction of the bubble, the liquid (ink) is discharged from the discharge opening to form at least one ink droplet. When the drive signal has a pulse shape, since the growth and contraction of the bubble can be quickly effected, more excellent ink discharge is achieved. Such pulse-shaped drive signal may be ones disclosed in U.S. Pat. Nos. 4,463,359 and 4,345,262. Incidentally, by adopting the condition disclosed in U.S. Pat. No. 4,313,124 providing the invention regarding the temperature increasing rate on the heat acting surface, a further excellent recording can be performed.

As the construction of the recording head, the present invention includes the construction wherein the heat acting portion is disposed in an arcuate area as disclosed in U.S. Pat. Nos. 4,558,333 and 4,459,600, as well as the constructions wherein the discharge openings, liquid paths and electrical/thermal converting elements are combined (straight liquid paths or orthogonal liquid paths). In addition, the present invention can applicable to the construction wherein each discharge opening is constituted by a slit with which a plurality of electrical/thermal converting elements associated in common as disclosed in the Japanese Patent Laid-Open No. 59-123670 and the construction wherein openings for absorbing the pressure wave of the thermal energy are arranged in correspondence to the discharge openings as disclosed in the Japanese Patent Laid-Open No. 59-138461.

Further, the present invention can be applied to a recording head of full-line type having a length corresponding to a maximum width of a recording medium to be recorded, as such recording head, the construction wherein such length is attained by combining a plurality of recording heads or a single recording head integrally formed may be adopted. In addition, the present invention is effectively applicable to a removable recording head of chip type wherein, when mounted on the recording system, electrical connection between it and the recording system and the supply of ink from the recording system can be permitted, or to a recording head of cartridge type wherein a cartridge is integrally formed with the head.

Further, it is preferable that a head recovering means and an auxiliary aiding means are added to the recording head according to the present invention, since the effect of the present invention is further improved. More concretely, these means include a capping means for capping the recording head, cleaning means, pressurizing or suction means, and an auxiliary heating means comprising electrical/thermal converters or other heating elements or the combination thereof. Further, it is effective for the stable recording to perform an auxiliary discharge mode wherein the ink discharge regardless of the recording ink discharge is effected.

Further, as the recording mode of the recording system, the present invention can effectively be applied not only to a recording mode with a single main color such as black, but also to a system providing a plurality of different colors and/or a full-color by mixing colors by using an integrated recording head or the combination of plural recording heads.

Further, in the illustrated embodiments, while the ink was liquid, the ink may be solid in a room temperature or less, or may be softened at a room temperature. In the above-mentioned ink jet recording system, since the temperature control is generally effected in a temperature range from 30° C. to 70° C. so that the viscosity of the ink is maintained within a stable discharging range, the ink may be liquidized when the record signal is emitted. In addition, ink having a feature that is firstly liquidized by the thermal energy, such as solid ink which serves to prevent the increase in temperature by absorbing energy in changing the ink from the solid state to the liquid state or which is in the solid state in the preserved condition to prevent the vaporization of ink and which is liquidized into ink liquid to be discharged in response to the record signal comprising the thermal energy, or ink which has already been solidified upon reaching the recording medium, can also be applied to the present invention. In such a case, the ink can be held in the liquid state or solid state in recesses or holos in porous sheet as disclosed in the Japanese Patent Laid-Open Nos. 54-56847 and 60-71260, in confronting relation to the electrical/thermal converters. Incidentally, in the present invention the above-mentioned film boiling principle is most effective for each ink.

As mentioned above, according to an ink jet recording head manufacturing method in accordance with the present invention, the following main advantages can be obtained, and the present invention is very effective in the practical use:

(a) The ink path wall forming member can be made uniform, and it is possible to easily manufacture a liquid jet recording head of high density multidischarge opening type;

(b) Since there is no problem even when the lid plate is initially curved, the lid plate can be selected within a wide range thereof regardless of the quality of the lid plate; and (c) Since the complicated alignment between the substrate plate and the lid plate is not required and the alignment can be attained by using a simple tool, the manufacturing method can be simplified and be made inexpensive.

What is claimed is:

1. A method for manufacturing a liquid jet recording head, comprising the steps of coating a path wall forming member on a solid layer disposed on a substrate plate and having a liquid path pattern communicating with liquid discharge openings, binding a lid plate to said substrate plate via said path wall forming member, and removing said solid layer, thereby forming liquid paths;

characterized in that, in said binding step, said lid plate is bound to said substrate plate via spacer means having a thickness greater than that of said solid layer and disposed at an area which does not correspond to said path pattern and via said path wall forming member, while applying a pressure toward a binding position.

2. A method for manufacturing a liquid jet recording head according to claim 1, wherein said lid plate is bound to said substrate plate after said spacer means are disposed.

3. A method for manufacturing a liquid jet recording head according to claim 1, wherein said spacer means are disposed on said substrate plate before said coating step.

4. A method for manufacturing a liquid jet recording head according to claim 1, wherein, in said binding step, said lid plate is bound to said substrate plate in such a manner that said spacer means are overlapped with said path wall forming member.

5. A method for manufacturing a liquid jet recording head according to claim 1, wherein, in said binding step, said lid plate in bound to said substrate plate in such a manner that said spacer means are not overlapped with said path wall forming member.

6. A method for manufacturing a liquid jet recording head according to claim 1, wherein said path wall forming member is curable by active energy rays, and said path wall forming member is cured by illuminating the active energy rays thereon after said binding step and before said liquid path forming step.

7. A method for manufacturing a liquid jet recording head according to claim 6, wherein said spacer means are made of the same material as that of said path wall forming member.

8. A method for manufacturing a liquid jet recording head according to claim 1, wherein said solid layer is made of positive photosensitive resin.

9. A method for manufacturing a liquid jet recording head according to claim 1, wherein said lid plate is made of material permeable the active energy rays.

10. A method for manufacturing a liquid jet recording head according to claim 1, wherein said spacer means are thicker than said solid layer by 10 μm or more.

11. A method for manufacturing a liquid jet recording head according to claim 10, wherein said spacer means have a thickness of 30 μm–500 μm.

12. A method for manufacturing a liquid jet recording head according to claim 1, wherein the binding pressure in said binding step has a value within a range of $1\times10^{-3}$ kg/cm$^2$–100 kg/cm$^2$.

13. A method for manufacturing a liquid jet recording head according to claim 1, wherein energy generating elements for generating energy utilized to discharge liquid from said liquid discharge opening are formed on said substrate plate in correspondence to said liquid paths.

14. A method for manufacturing a liquid jet recording head according to claim 13, wherein said energy generating elements comprise electrical/thermal converters for generating thermal energy.

15. A method for manufacturing a liquid jet recording head according to claim 1, wherein energy generating elements for generating energy utilized to discharge liquid from said liquid discharge openings are formed on said substrate plate in correspondence to said liquid paths, and said spacer means comprise common electrodes connected to said energy generating elements.

16. A method for manufacturing a liquid jet recording head according to claim 15, wherein said common electrodes are formed by an electroplating technique.

17. A method for manufacturing a liquid jet recording head according to claim 15, wherein said energy generating elements comprise electrical/thermal converters for generating thermal energy.

18. A method for manufacturing a liquid jet recording head according to claim 1, further including a step of cutting a portion including said spacer means, between said binding step and said liquid path forming step.

19. A method for manufacturing a liquid jet recording head according to claim 1, further including a step of forming a surface on which said liquid discharge openings are disposed by cutting an article obtained by said binding step, between said binding step and said liquid path forming step.

* * * * *

UNITED STATES PATENT AND TRADEMARK OFFICE

CERTIFICATE OF CORRECTION

PATENT NO. : 5,332,466

DATED : July 26, 1994

INVENTOR(S) : MINORU NOZAWA

It is certified that error appears in the above-indentified patent and that said Letters Patent is hereby corrected as shown below:

On the title page item,

[56] References Cited, under FOREIGN PATENT DOCUMENTS: "1128840 5/1989 Japan" should read --1-128840 5/1989 Japan--.

COLUMN 2

Line 34, "chamber" should read --chamber is--.

COLUMN 6

Line 55, "shoiwng" should read --showing--.

COLUMN 7

Line 63, "FIG. 2F)." should read --FIG. 2F.)--.

COLUMN 9

Line 32, "convey" should read --conveyor--.

COLUMN 10

Line 21, "liquidified." should read --liquified.--.

COLUMN 11

Line 26, "liquidified." should read --liquified.--.
Line 68, "in" should be deleted.

UNITED STATES PATENT AND TRADEMARK OFFICE

CERTIFICATE OF CORRECTION

PATENT NO. : 5,332,466
DATED : July 26, 1994
INVENTOR(S) : MINORU NOZAWA

It is certified that error appears in the above-indentified patent and that said Letters Patent is hereby corrected as shown below:

COLUMN 12

Line 23, "can" should read --can be--.

COLUMN 13

Line 5, "liquidized" should read --liquified--.
Line 7, "liquidized" should read --liquified--.
Line 12, "liquidized" should read --liquified--.

COLUMN 14

Line 5, "in" (first occurrence) should read --is--.
Line 23, "the" should read --to--.

Signed and Sealed this

Twentieth Day of December, 1994

Attest:

BRUCE LEHMAN

*Attesting Officer* *Commissioner of Patents and Trademarks*